United States Patent Office 3,545,175
Patented Dec. 8, 1970

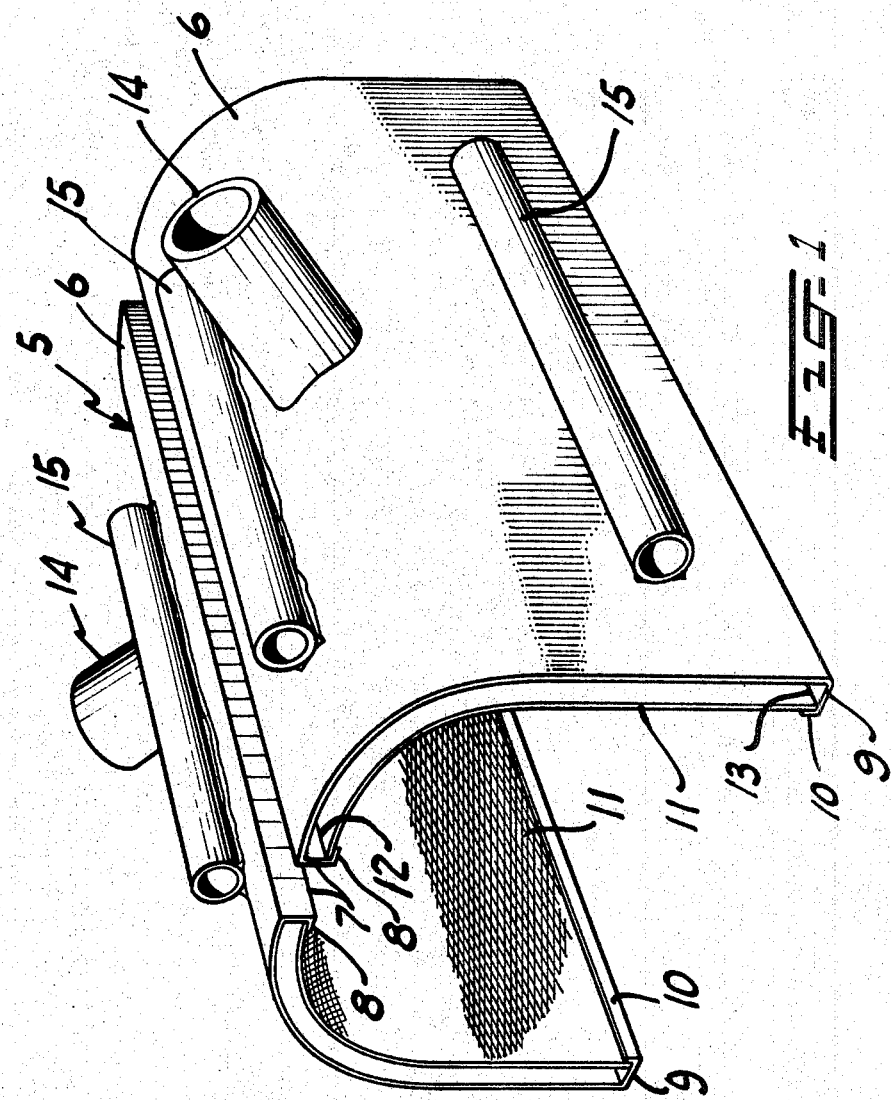

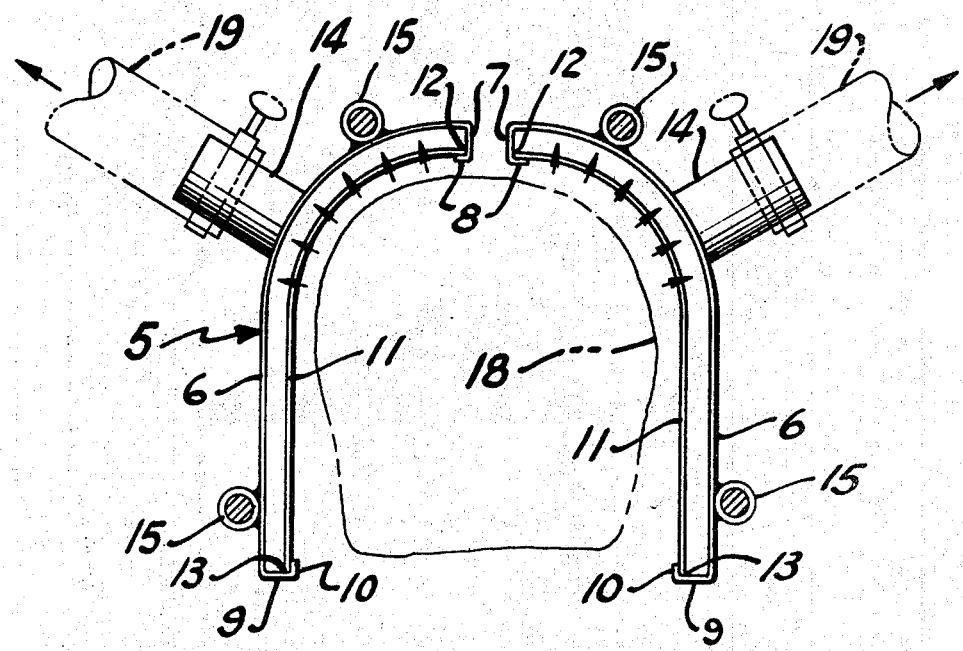
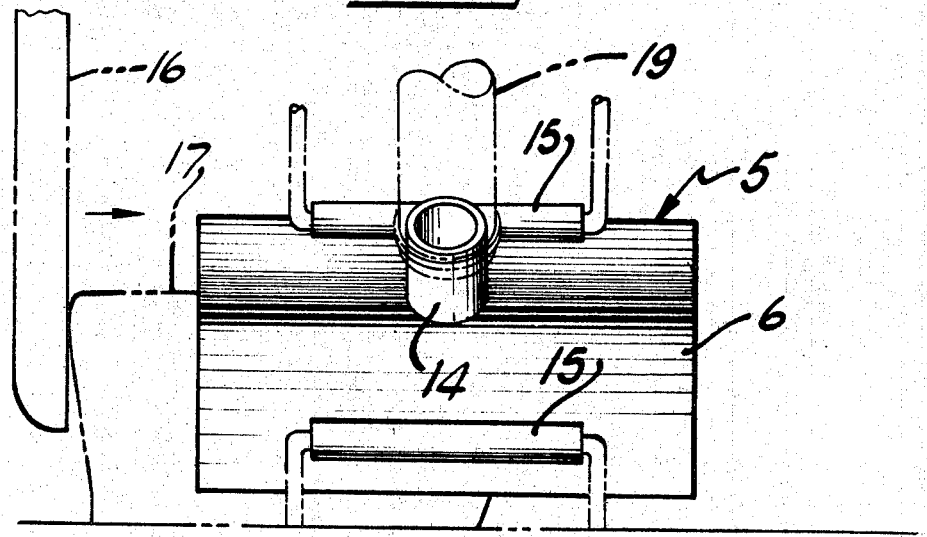

3,545,175
SUCTION ARC BAG HOLDER FOR AUTOMATIC BREAD BAGGER
Nils A. Lillund, 1113 Springingsguth Road,
Schaumburg, Ill. 60172
Filed Aug. 9, 1968, Ser. No. 751,400
Int. Cl. B65b 43/36
U.S. Cl. 53—386                        3 Claims

ABSTRACT OF THE DISCLOSURE

This invention relates to the packaging art; more particularly, to that branch of the art that deals with the packaging of loaves of bread in bakeries.

---

This invention consists of two inverted J-shaped members, identical in both size and construction, and longitudinal and in equally spaced relation to each other. The inside of each aforesaid inverted J-shaped member is provided with a sheet of perforated metal the same length as that of the member to which it is secured and is in equal and parallel spaced relation to the members inside surface. An opening is provided in the longitudinal center of each of the aforesaid inverted J-shaped members in which suction is applied through a hose or pipe connected to a pipe nipple that is secured to the outside surface of each just-mentioned member. Each member is provided with two elongated bushings that are suitably secured to the outside surface of each of the aforementioned inverted J-shaped members.

It is the principal object of this invention to provide a suction arc bag holder for an automatic bread bagger that is more efficient than any similar apparatus now on the market by reason of its simplicity in construction, as will be understood by those experienced in the art upon examination of the accompanying drawings.

Another object of this invention is to provide a suction arc bag holder for an automatic bread bagger that can be adjusted in both height and width for nearly any size loaf of bread.

Still another object of this invention is to provide a suction arc bag holder for an automatic bread bagger that contains a minimum number of parts that can be easily cleaned in a minimum of time and with a minimum of effort by even the most inexperienced person in the art of bagging bread.

With these and other objects in view, the nature of which will become more apparent, the invention will be more fully understood by reference to the appended drawings, the accompanying detailed description of the invention, and the appended claims.

In the drawings:

FIG. 1 is a pictorial view of this invention.

FIG. 2 is an end view of this invention.

FIG. 3 is a side view of this invention, showing a loaf of bread being pushed into the same. Both the loaf of bread and the transfer arm are shown in phantom lines.

In the several views of the appended drawings, like parts of this invention are indicated by like reference numbers.

The reference number 5 indicates this invention in its entirety.

Directing one's attention to FIG. 1 of the appended drawings, it will be seen that this invention 5 consists of an elongated housing formed of a complementary pair of inverted J-shaped members 6. The housing of the two J-shaped members and their associated parts form a tunnel through which loaves of bread may pass. The interior of the housing constitutes a suction arc. The two aforesaid members 6 are identical in both size and construction except that one is a left hand member and one is a right hand member. For this reason, both members and their associated parts are herein indicated by the same reference numbers for reasons of simplicity. The legs of the J-shaped members constitute the spaced apart side walls of the elongated housing while the curved bottoms of the J members are turned toward each other and together constitute the curved top of the elongated housing. The two inverted J-shaped members are in longitudinal and equal spaced parallel relation to each other in order that the bread transferarm may pass between the top of the two members forming the elongated housing, as will hereinafter become obvious on the reading of the operation of this invention and its related devices.

Each inverted J-shaped member 6 is preferably made of an outer imperforate sheet metal and has a vertically and downwardly disposed longitudinal edge 7 that terminates in the horizontally disposed flange 8. The bottom longitudinal edge is formed into a horizontally disposed member 9 that terminates in an upwardly and vertically disposed flange 10. An inner sheet or wall of perforated metal 11, the same length and basic configuration as that of the aforesaid inverted J-shaped member 6, is located inside the just-mentioned member 6 with the upper longitudinal edge 12 of the sheet 11 resting on the inside surface of the aforesaid flange 8, while the bottom longitudinal edge 13 rests on the inside surface of the aforesaid horizontally disposed member 9.

Looking now at FIGS. 2 and 3 of the appended drawings, it will be seen that a pipe nipple 14 has one end secured in an angularly disposed position to the outside surface of the aforesaid inverted J-shaped member of this invention. The nipple is centrally located longitudinally on the just-mentioned member and is over an opening in the member whose purpose will shortly be described. Two elongated buhings 15 are welded or otherwise secured to the outside surface of each of the aforesaid inverted J-shaped members 6 in the position shown in the appended drawings. The purpose of these bushings is to provide a means of securement for the holding and adjusting rods of the aforesaid inverted J-shaped members of this invention. The description of the construction of this invention of a suction arc bag holder for an automatic bread bagger is now completed. The way in which this invention is used is as follows:

A bread transferarm 16, that is shown partially in phantom lines in FIG. 3 of the drawings, pushes the loaf of bread 17, from the bread slicer (not shown in the drawings) through an electric eye, also not shown in the drawings. It then moves on into this invention between the inside walls of the two aforesaid sheets of perforated metal 11. A beam of light from the electric eye energizes a solenoid valve that is also not shown in any of the views of the drawings. The solenoid is suitably hooked up to an air pipe in which the air is under a 30- to 40-ponnd pressure. The orifice of the pipe is pointed toward the mount of the bag in which the loaf of bread is to be placed. A momentary energizing of the aforesaid solenoid valve causes the air to open the bag. The suction which is applied to this invention through suitable hose or pipes 19 connected to each of the aforesaid pipe nipples 14 will now take over and draw the sides of the bag 18 out against the aforesaid sheet of perforated metal 11 that is a part of each of the aforesaid inverted J-shaped members 6 of this invention. The already-mentioned transferarm 16 is pushing the loaf of bread 17 into the bag 18; when the loaf of bread 17 starts pushing against the bottom of the bag 18, it will also push the bag out from the aforesaid suction arc. The holding power of the suction arc is regulated by two choke valves, one valve of which is for each half of this bag holder. The suction is supplied by any desirable means such as a regular vacuum cleaner motor and impeller or the like.

From the foregoing, it is seen that I have herein provided a new and novel suction arc bag holder for an automatic bread bagger that meets all of the objects of this invention. This apparatus is subject to any and all changes in detail design and construction and all modifications one may care to make in so long as the changes and/or modifications fall within the scope and intent of the appended claims.

What I now claim as new and desire to protect by grant of Letters Patent as set forth in the United States Code Title 35—patents is:

I claim:

1. A suction arc bag holder for automatic bread bagger, comprising two inverted J shaped members in longitudinal and equal spaced relation to each other, the said two inverted J shaped members having structure therein adapted to receive and hold the bag in which a loaf of bread is pushed when suction is applied to the said members, said structure consisting of a sheet of perforated metal that is held a predetermined distance inward from the inside wall of the inverted J shaped member, the upper longitudinal edge of each of the said inverted J shaped members being vertically and downwardly disposed to terminate in a horizontally disposed flange against the upper surface of which rests the longitudinally disposed edge of the said sheet of perforated metal, the bottom longitudinal edge of each of the said inverted J shaped members being formed into a horizontal disposed member terminating in an upwardly and vertically disposed edge, the bottom longitudinal edge of the said sheet of perforated metal resting on the upper surface of the said horizontally disposed member of the said inverted J shaped member, each of the inverted J shaped members being provided with an angularly disposed nipple secured to the outside surface thereof in the longitudinal center of the inverted J shaped member; an opening in the said member being located inside the said pipe nipple; each nipple being connected to a suction hose or pipe.

2. The invention of claim 1, wherein each of the said inverted J shaped members is provided with two elongated bushings on the outside surface thereof.

3. A bagger for the mechanized bagging of loaves of bread in which there is employed prefabricated flexible bags, the bags being stored in a generally collapsed condition and the bagger comprising a flexible bag extending means during the time the loaf of bread is inserted in the bag, said extending means including a horizontally disposed elongated tunnel shaped housing of substantially the length of a loaf of bread, said housing formed of a complementary pair of inverted J shaped members with the legs thereof arranged in spaced apart parallelism and constituting the sides of the elongated housing and the curved bottoms of the J turned toward each other and constituting the top of the elongated housing, the end shape of the elongated housing generally simulating the end shape of a loaf of bread, said elongated housing defining a horizontal passageway for the endwise passage of loaves of bread to be bag packed, each of said elongated housing J shaped members having an outerimperforate wall and having an inner perforated wall spaced inwardly from said outer imperforate wall, means applying suction to the interior of each of said J shaped members, whereby when one of the collapsed prefabricated flexible bags capable of being extended to the general shape of a loaf of bread is inserted in the tunnel the bag is extended and held in an open condition throughout its length against the perforated inner walls of the J shaped members, the curved bottoms of the J shaped members spaced apart a short distance to define an open slot with generally parallel side walls in the top of said elongated housing over the full length of the tunnel, a pusher element having a portion thereof extending down through the defined open slot in the elongated housing whereby the pusher moves a loaf of bread into an extended bag and thence moves the bread and its covering bag longitudinally through the full length of the tunnel.

References Cited

UNITED STATES PATENTS 3,468,102   9/1969   Farrar et al. _____ 53—386X

TRAVIS S. McGEHEE, Primary Examiner